Dec. 16, 1952 V. H. FRAY 2,621,343
SCREW OR LIKE NICKING MACHINE
Filed Jan. 22, 1949 2 SHEETS—SHEET 1

INVENTOR
VICTOR HILL FRAY
BY
Haseltine, Lake & Co
AGENTS

Dec. 16, 1952  V. H. FRAY  2,621,343
SCREW OR LIKE NICKING MACHINE
Filed Jan. 22, 1949  2 SHEETS—SHEET 2

INVENTOR
VICTOR HILL FRAY
BY
Haseltine, Lake & Co
AGENTS

Patented Dec. 16, 1952

2,621,343

UNITED STATES PATENT OFFICE 2,621,343

SCREW OR LIKE NICKING MACHINE

Victor Hill Fray, Auckland, New Zealand

Application January 22, 1949, Serial No. 72,215
In New Zealand March 8, 1948

5 Claims. (Cl. 10—6)

This invention relates to machines for working metal blanks fed thereto in rapid succession and more particularly to screw or like nicking machines known as "screw nickers," used for cutting the screwdriver slots in the heads of screws, metal thread bolts and the like, and comprising essentially screw blank carrier drum means and a tool, for example a circular saw located eccentrically inside the carrier drum means.

My machine includes carrier drum means rotatable about a horizontal axis or one inclined up to approximately 45°, said carrier drum means being rotatable by suitable drive means. The metal blanks, screw blanks or the like are fed to and supported in suitable slots formed in one face of the carrier drum means with their heads facing toward the center of the carrier and are carried in a circular path starting from the lowest point thereof. A portion of said path is swept by a working element of the tool, for example by the teeth of metal cutting saw means which cuts nicks in the heads of the blanks. The slots in the carrier drum means which extend radially thereof are ratchet-shaped and means is provided to press the blanks to retain the same in the slot from the feed point through the working zone to a discharge point, means also being provided at said discharge point for removing the blanks with the nicks cut therein for the carrier drum means. Generally speaking, my invention has been devised to provide a combination and arrangement of parts which not only effects an improved machine but one which is capable of extremely high speeds.

In describing the invention reference will be made to the accompanying drawings in which.

Figure 1:
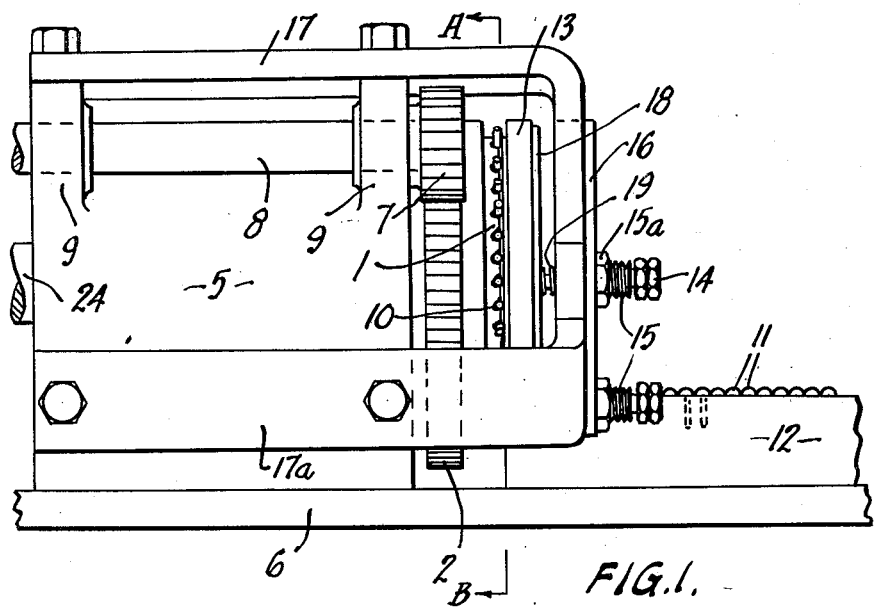
Figure 1 shows a side elevation of the apparatus.
Figures 3, 4:
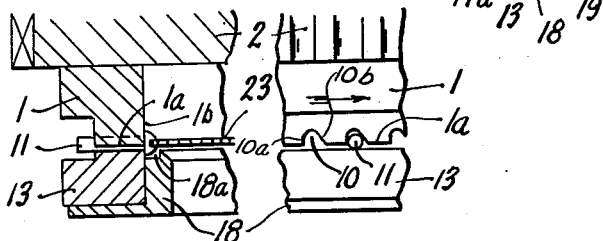
Figure 5:
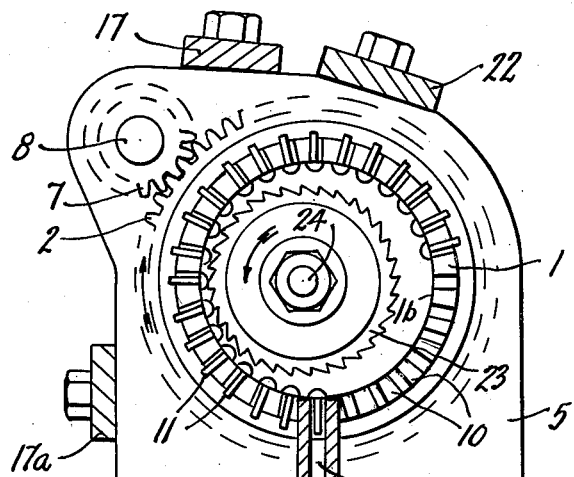
Figure 6:
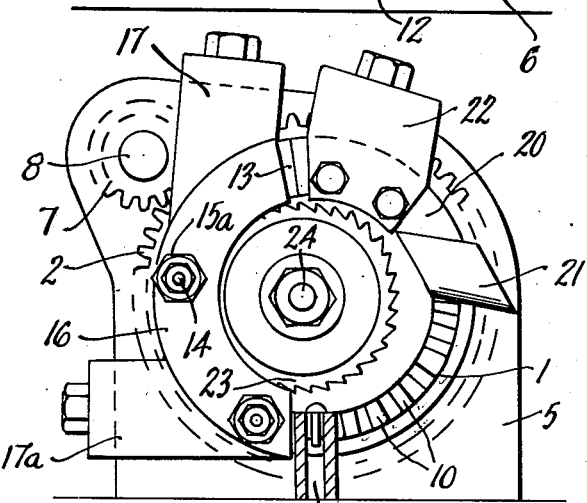
Figures 7, 8:
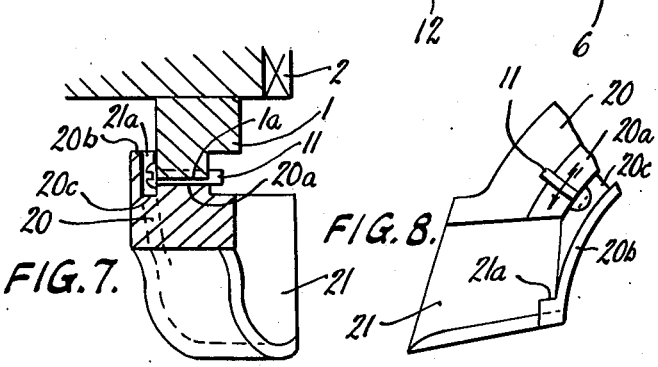

Figure 3 is an enlarged partial sectional view of the carrier drum and the retaining ring, Figure 4 is an enlarged partial plan view of the parts of Fig. 3, Figure 5 is a vertical section on line A—B of Fig. 1, Figure 6 is an end elevation of Fig. 1, Figure 7 is an enlarged sectional elevation across the holding and discharging segment at a point just above the delivery box of such segment and Figure 8 is an enlarged partial inside face view of the holding and discharge segment at the discharge box end thereof.

Figure 2:
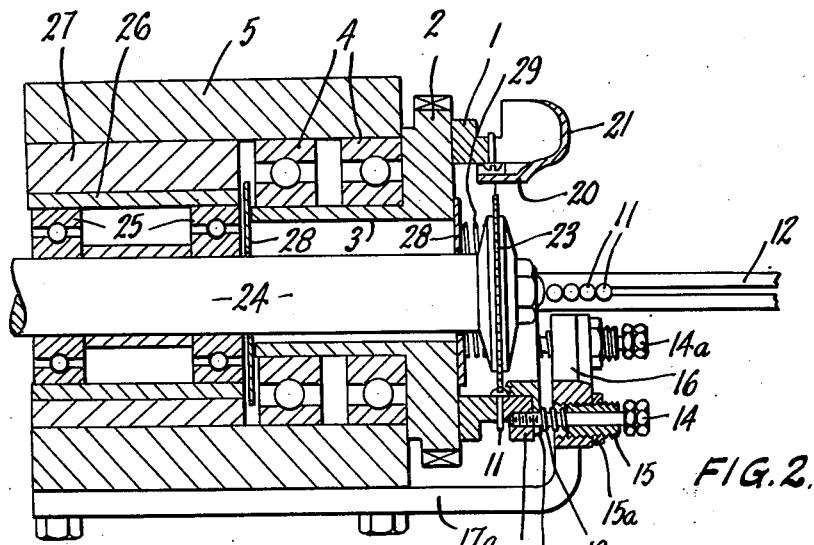
Figure 2 is a sectional plan view of the apparatus.

In the invention, there is a cylindrical carrier drum 1 of ring form, secured to or integral with a gear wheel 2 from the end of which said carrier drum 1 concentrically extends, such gear wheel 2 having a hollow shaft 3 (see Fig. 2) by which said gear wheel 2 and the carrier drum 1 are rotatably mounted in bearings 4 disposed within the outer end of a head casting or like 5 which is rigidly secured to a bedplate or like 6, a pinion 7 in mesh with the gear wheel 2 being disposed on a drive shaft 8 rotatably mounted within bearings 9 extending from the head 5, such drive shaft 8 being adapted to receive suitable power drive (not shown).

The face 1a of the carrier drum 1 has radial blank receiving slots 10 cut therein which are of substantially ratchet form as will be more clearly seen from Fig. 4, said slots being also of such depth as to receive the shank portions of screw or like blanks 11 only to an extent whereby some small portion of the shank of the blank will project to beyond the end face 1a, the heads of the blanks 11 bearing against the inner periphery or bore 1b of the carrier drum 1 as shown in Figs. 3 and 5.

It has been found that the thrust on a screw blank is appreciable when contacted by the saw, and with the blank resting on an angular face cut in the surface 1a of the carrier drum and making an angle of less than about 80° with the face of the drum, the blank would twist so that the cut would not be true and in fact the heads of the blanks would be damaged. It has been found that this disadvantage does not occur when the blank receiving slots are substantially rachet-shaped. Therefore, the slots 10 each comprises an abutment face or surface 10a, having an angularity relative to the surface 1a in the order of a right angle, against which the blanks are clamped, as hereinafter described, during the operation performed thereon. The slots 10 each also has an entrance or leading side 10b inclined relative to the plane of surface 1a at a lesser angle so that the slot entrance or mouth is relatively large as compared with the effective depth thereof and is materially larger than the diameter of the blanks operated upon.

Disposed on the bedplate 6, a known form of chute 12 conveys the blanks 11 from any suitable blank hopper (not shown) which feeds the blanks 11 via the chute 12 to the lower portion of the carrier drum 1, the chute 12 terminating just clear of contact with the drum 1.

From this point at which the chute 12 terminates, to a position around the drum 1 almost directly above, a retaining plate 13 extends, this being of segment form and carried by studs 14 and 14a which are slidable within adjustment screws 15 which in turn screw into a rigid segment 16 which is integral with or attached to rigid arms or brackets 17 and 17a which are secured to the head 5.

The retaining plate 13 has an attached or integral head retaining segment 18 which presents a head retaining slot 18a (see Fig. 3), the retaining plate 13 and the segment 18 being both yieldingly moved towards the end face 1a of the drum 1 by compression springs 19 (see Fig. 2) disposed over the studs 14 and 14a between the segment 18 and the adjustment screws 15, the latter being provided with lock nuts 15a so that a desired setting of the pressure of the springs 19 can be obtained and retained to cause the retaining plate 13 to press against the blanks 11 within the slots 10 of the drum 1, while the head retaining slot 18a of the segment 18 is so located as to present an obstacle to the inward movement of the blanks 11 because of the heads of the latter coming into contact with the rim of the slot 18a.

The retaining plate 13 is positioned at that portion of the apparatus at which the slots are cut in the heads of the blanks 11, but beyond such location of the retaining plate 13 there is no necessity for applying pressure on the blanks 11, it being only necessary to retain them in position in the slots 10 of the drum 1 up to the point at which they are discharged from the machine.

From the termination of the retaining plate 13, a holding and discharging segment 20 continues to a delivery box 21 (see Figs. 6, 7, and 8) this segment 20 being rigidly secured to a rigid arm or bracket 22 which is secured to the head 5.

This holding and discharging segment 20 (see Fig. 7) presents a rubbing surface 20a which contacts or nearly contacts the shank portions of the blanks 11 and presents a flange 20b and a groove 20c which respectively prevent inward travel of the blanks and also a passage for the heads of the blanks, this flange 20b terminating in a ramp 21a which is inclined downward towards the open side of the delivery box 21, the groove 20c also terminating at the open side of the delivery box 21 which side is closely adjacent to the outer end face 1a of the carrier drum 1.

Also revolvably mounted in the head 5, there is the nicking saw 23, this being a metal cutting circular saw mounted on the end of a horizontal shaft 24 which passes through the hollow shaft 3 of the gear wheel 2 and is mounted in bearings 25 (see Fig. 2) such bearings 25 being mounted within an eccentric 26 which in turn is adjustably rotatable within a further eccentric 27 which is also adjustably rotatable within the head 5 at the inner end thereof, the objects of this mounting arrangement being to give adjustable movements of the depth the saw will cut into the heads of the blanks 11.

The saw 23 projects to a position within the carrier drum 1 at which its teeth will pass across the heads of the blanks 11 located within the slots 10 of the carrier drum 1 and only in the vicinity of the retaining plate 13 because of being in an eccentric position in relation to the carrier drum 1.

The saw drive shaft 24 is adapted to receive any suitable power drive (not shown) and may have washer plates or the like 28 freely disposed thereon to prevent swarf or metal shavings from getting into the hollow shaft 3 and also to the bearings 4 and 25, a spring 29 pressing one of the plates 28 against the end of the gear wheel 2 to cover the bore of the shaft 3.

Although the apparatus is shown as though horizontally disposed, in actual use it is preferable that same be inclined downward at an angle from the chute end 12 to the head end 5 of the bedplate 6, the angle being such as is usual for the gravity feed of the blanks 11 down the chute 12.

In use or operation, with the hopper means charged with the screw blanks 11 and feeding same down the chute 12 to the carrier drum 1 which is revolving in a clockwise direction as indicated by the arrow in Fig. 5, and with the nicking saw 23 rotating in an anti-clockwise direction at suitable speed, as empty ratchet like slots 10 of the carrier drum 1 pass the discharge end of the chute 12, with the abutment sides 10a of the ratchet like slots trailing the inclined leading sides 10b, the blanks 11 enter said ratchet like slots 10 with their heads bearing against the inner periphery 1b and facing inwardly towards the drum centre and their shanks resting within the slots 10 and pointing outwardly. The large opening or mouth provided on each ratchet like slot 10, due to the configuration of the leading inclined side 10b with respect to the trailing abutment side 10a, permits the blanks 11 to be fed into the ratchet like slots 10 at an extremely high rate of speed since a blank can begin to enter a slot as soon as the leading side or surface 10b thereof is adjacent the discharge end of chute 12. Consequently, the carrier drum can be rotated at a higher speed than would be the case if the entrance or mouth of the slots 10 were smaller, for example in the order of the diameter of the shanks of the blanks. As the blanks 11 come to rest in the ratchet like slots 10 they engage the sides 10a and 10b and hence are carried around with the carrier drum.

The rotation of the drum 1 causes the blanks 11 within the slots 10 to pass into engagement with the retaining plate 13 and this latter presses them firmly within the slots 10 while the head retaining slot 18a of the segment 18 ensures that the heads of the blanks 11 are located in position in contact with the inner periphery 1b of the drum 1 so that in passing under the saw 23, uniform depths of cut are made in the heads.

The travel of the blanks 11 in the circular path carries them under the saw 23 and thus the nicks are cut in the heads, the saw 23 contacting several of the heads all the time and effecting the cuts progressively as the heads pass thereunder and away.

On having passed the saw 23, the rotation of the carrier drum 1 moves the blanks 11 with the nicks now cut therein to under the holding and discharging segment 20, the blanks 11 ceasing to be under pressure within the slots 10 but still being retained therein until they have travelled to the delivery box 21.

At such delivery box 21 the rubbing surface 20a and the groove 20c terminate, there being a clear open side to the box 21 at which the blanks 11 become exposed, but although they have ceased to be actually held within the slots 10 and could fall out on reaching the delivery box 21, they have to be assisted out of the slots 10 and at speed.

This removal of the blanks 11 from the slots 10 is caused by their heads which have been passing around the groove 20c coming into contact with the obstructing ramp 21a and as this is inclined downward in the direction of the delivery box 21, the blanks 11 are moved out of the slots 10 in a head first manner, to then roll out of the delivery box 21 into any receptacle for receiving same.

I claim:

1. In a machine of the character referred to, a frame, a carrier drum rotatably supported by said frame and comprising a ring-shaped axial projection at one end provided with a plurality of generally ratchet shaped radially disposed slots in its end face adapted to receive blanks at a pick-up station and convey them in an arcuate path through a work station, the said slots each comprising an abutment side and an entrance side with the angularity of the latter relative the end face of said projection being less than the angularity of the abutment side, and the dimensions of said slots relative to that of the blanks being such that the sides of the blanks received in the slots project beyond the plane of said end face, means for rotating said carrier drum in a direction to cause said ratchet like slots to travel in a circular path with their abutment sides trailing, a circular metal cutting tool at said work station rotatable within said carrier drum about an axis parallel to and offset with respect to the axis of rotation of said carrier drum and adapted to simultaneously cut the inner ends of a plurality of blanks carried therepast by said carrier drum, pressure plate means carried by said frame and having a blank-engaging and clamping surface juxtaposed to said end face of said carrier drum and extending from a location adjacent to said pick-up station to a location beyond said work station, the distance between said end face and said pressure plate means being such that the latter engages the said sides of the blanks projecting beyond the face of said carrier drum as the blanks are carried by said carrier drum from said pick-up station through said work station for resiliently clamping the blanks in said slots thereby preventing rotation of the blanks in said slots while the blanks are engaged by said tool, and means for removing the blanks from said ratchet like slots in said carrier drum after they have passed said tool.

2. In a screw and like nicking machine, a frame, a carrier drum supported by said frame for rotation about a non-vertical axis and comprising a ring-shaped axial projection at one end having an end face provided with a plurality of radially disposed slots of generally ratchet shape adapted to receive headed blanks at a pick-up station and convey them in an arcuate path through a work station, each of said ratchet like slots comprising an abutment side and a leading side with the abutment side having an angularity relative to said end face in the order of a right angle and with the leading side inclined at a lesser angle relative to the plane of the end face so that the widths of the openings of said slots exceed the effective depths thereof with the depths of the slots being less than the diameter of the blanks, means for rotating said carrier drum whereby said ratchet like slots are moved in a circular path with the said abutment sides trailing, means at said pick-up station adapted to feed headed blanks into the said ratchet like slots adjacent to the bottom of said circular path with the heads of said blanks toward the center of said carrier drum, a circular metal cutting saw at said work station rotatable within said carrier drum about an axis offset with respect to the axis of rotation of said carrier drum and adapted to simultaneously cut slots in the heads of a plurality of blanks carried therepast by said carrier drum, resilient means including a pressure plate carried by said frame and having a blank engaging and clamping surface juxtaposed to said end face of said carrier drum and extending from a location adjacent said pick-up station to a location beyond said work station for engaging blanks in said slots as they are carried by said carrier drum from said pick-up station to said work station, the distance between the said end face and said pressure plate being such that the latter fixedly clamps the blanks in said slots against rotation therein while the blanks are engaged by said tool, and means for removing blanks from said slots in said carrier drum after they have passed beyond said tool.

3. In a screw and like nicking machine, a frame, a carrier drum supported by said frame for rotation about a non-vertical axis and comprising a ring-shaped axial projection at one end having a planar end face provided with a plurality of radially disposed slots of generally ratchet shape adapted to receive headed blanks at a pick-up station and convey them in an arcuate path through a work station, each of said ratchet like slots comprising an abutment side and a leading side with the latter side inclined relative to the said planar end face at an angle such that the width of the entrance to each slot exceeds the diameters of said blanks and the effective depth of each slot is less than the diameter of said blanks, means for rotating said carrier drum so that said ratchet like slots are moved in a circular path with their abutment sides trailing, means at said pick-up station adapted to continuously feed headed blanks into engagement with the said end face of said carrier drum adjacent to the bottom of said circular path with the heads of the blanks directed toward the center of said carrier drum whereby each blank begins to enter a slot before the abutment side of the latter arrives at the pick-up station, a circular metal cutting saw at said work station rotatable within said carrier drum about an axis offset with respect to the axis of rotation of said carrier drum and adapted to simultaneously cut slots in the heads of a plurality of blanks carried therepast by said carrier drum, resilient means including a pressure plate carried by said frame and having a blank engaging and clamping surface juxtaposed to said planar end face of said carrier drum and extending from a location adjacent said pick-up station to a location beyond said work station for engaging blanks in said slots as they are carried by said carrier drum from said pick-up station to said work station, the distance between the said end face and said pressure plate being such that the latter fixedly clamps the blanks in said carrier drum against rotation within said slots while the blanks are engaged by said tool, and means for removing blanks from said slots in said carrier drum after they have passed beyond said tool.

4. In a machine of the character referred to, a frame, a carrier drum supported by said frame for rotation about a non-vertical axis and comprising a ring-shaped axial projection at one end provided with radial slots in its end face adapted to receive blanks at a pick-up station and convey them in an arcuate path through a work station, means for rotating said carrier drum whereby said slots are moved in a circular path, said slots having their leading sides inclined with respect to said face of said carrier drum in which they are formed, means at said pick-up station adapted to feed headed blanks into said slots adjacent to the bottom of said circular path with their heads toward the center of said carrier drum, a circular metal cutting tool at said work station rotatable within said carrier drum about an axis offset with respect to the axis of rotation of said carrier drum and adapted to cut the heads of blanks carried therepast by said carrier drum, adjustment screws on said frame, studs extending through said adjustment screws, a retaining plate carried by the studs, said retaining plate being located adjacent to said face of said carrier drum having said radial slots therein adapted to engage blanks in said slots and retain the same therein while they are carried by said carrier drum from said pick-up station through said work station, spring means on said studs yieldingly moving said retaining plate to press against the blanks within the carrier drum, and means for removing blanks from said slots in said carrier drum after they have passed said tool, said last-named means including a member within said ring-shaped projection having an inclined surface facing longitudinally of the axis of rotation of said carrier drum and adapted to be engaged incident to the rotation of the carrier drum by the radially inner ends of blanks positioned in said slots.

5. In a machine of the character referred to, a frame, a carrier drum rotatably supported by said frame and comprising a ring-shaped axial projection at one end provided with radial ratchet tooth-like slots in its end face adapted to receive headed blanks at a pick-up station with a side projecting beyond said end face and convey them in an arcuate path through a work station, means for rotating said carrier drum whereby said slots are moved in a circular path, said slots having their leading sides in the direction of rotation of the carrier drum inclined less than the trailing sides relative to the face of the carrier drum in which they are formed, means at said pick-up station adapted to feed headed blanks into said slots with their heads toward the center of said carrier drum, a circular metal cutting tool at said work station rotatable within said carrier drum about an axis offset with respect to the axis of rotation of said carrier drum and adapted to cut the heads of blanks carried therepast by said carrier drum, pressure plate means having a blank-engaging and clamping surface juxtaposed to said face of said carrier drum having said ratchet-like slots therein and extending from adjacent to said pick-up station to a point beyond said work station for engaging blanks in said slots while they are carried by said carrier drum from said pick-up station to said work station and for fixedly clamping blanks in said carrier drum against rotation in said slots while they are engaged by said tool, means for slidably supporting said pressure plate means for linear movement toward and from said face of said carrier drum having said ratchet like slots therein, spring means connected to said frame for causing said pressure plate means to resiliently press against blanks in said slots in said carrier drum, and means for removing blanks from said slots in said carrier drum after they have passed said tool, said last-named means including a member in the path of blanks carried by said carrier drum.

VICTOR HILL FRAY.

REFERENCES CITED

The following references are of record in the file of this patent:

UNITED STATES PATENTS

| Number | Name | Date |
| --- | --- | --- |
| 101,228 | Clement | Mar. 29, 1870 |
| 1,153,540 | Carpenter | Sept. 14, 1915 |
| 1,615,137 | Ruby | Jan. 18, 1927 |

FOREIGN PATENTS

| Number | Country | Date |
| --- | --- | --- |
| 379,262 | Germany | Aug. 20, 1923 |